United States Patent
Bohner et al.

[19]

[11] Patent Number: 5,884,724
[45] Date of Patent: Mar. 23, 1999

[54] STEERING SYSTEM FOR A NON-TRACK VEHICLE

[75] Inventors: Hubert Bohner, Boeblingen; Martin Moser, Fellbach, both of Germany

[73] Assignee: Mercedes-Benz AG, Stuttgart, Germany

[21] Appl. No.: 764,515

[22] Filed: Dec. 12, 1996

[30] Foreign Application Priority Data

Dec. 15, 1995 [DE] Germany ................. 195 46 943.7

[51] Int. Cl.[6] ............................................ B62D 5/09
[52] U.S. Cl. ........................................................ 180/402
[58] Field of Search ................... 180/402, 403, 180/443, 446, 421, 422; 701/41

[56] References Cited

U.S. PATENT DOCUMENTS

| 4,658,927 | 4/1987 | Kanazawa . | |
|---|---|---|---|
| 4,705,130 | 11/1987 | Fukunaga et al. | 180/402 |
| 4,984,646 | 1/1991 | Sano et al. | 180/402 |
| 5,072,803 | 12/1991 | Kilian et al. . | |
| 5,097,917 | 3/1992 | Serizawa et al. | 180/402 |
| 5,159,553 | 10/1992 | Karnopp et al. | 180/402 |
| 5,201,380 | 4/1993 | Callahan | 180/403 |
| 5,265,019 | 11/1993 | Harara et al. . | |
| 5,284,219 | 2/1994 | Shimizu et al. . | |
| 5,347,458 | 9/1994 | Serizawa et al. | 180/402 |
| 5,386,879 | 2/1995 | Shimizu . | |

FOREIGN PATENT DOCUMENTS

| 0317390 A | 5/1989 | European Pat. Off. . |
|---|---|---|
| 44 38 929 | 10/1995 | Germany . |
| 2205288 | 12/1988 | United Kingdom . |

*Primary Examiner*—Kevin Hurley
*Attorney, Agent, or Firm*—Evenson, McKeown, Edwards & Lenahan, P.L.L.C.

[57] ABSTRACT

A steering system for non-track vehicles, and a method of controlling a steering transmission ratio of a non-track vehicle, in which the steering transmission ratio between the adjusting paths of the steering handle and the steered wheels is changed corresponding to a characteristic diagram as a function of the driving speed as well as of the adjusting paths of the steering handle or the steered wheels.

20 Claims, 2 Drawing Sheets

STEERING SYSTEM FOR A NON-TRACK VEHICLE

BACKGROUND AND SUMMARY OF THE INVENTION

This invention relates to a steering system for a non-track vehicle having a steering handle or a steering wheel, and at least one steered vehicle wheel operated thereby, with a variable steering transmission ratio existing between the adjusting movement of the steering handle and the adjusting movement of the steered wheels which changes with the steering angle. This invention also relates to a method of controlling a steering transmission ratio of a non-track vehicle In the case of steering systems of passenger cars, the steering kinematics, as a rule, are constructed such that the steering becomes more direct with an increasing steering angle (the angle of the steered wheels with respect to a straight-ahead position). In other words, the steering transmission ratio between the adjusting movement of the steering handle and the adjusting movement of the steered wheels becomes smaller with an increasing steering angle. For example, in the case of a rack and pinion steering, this can be achieved by varying the base tangent length over the path of the steering rack.

In the case of conventional vehicle steering systems, the steering handle and the steered wheels are mechanically coupled with one another in a securely fixed manner in order to ensure a high safety under all conditions. U.S. Pat. No. 4,658,927 and U.S. Pat. No. 5,072,083 show known vehicle steering systems.

However, control systems without a mechanically fixed coupling are known in principle. For example, in airplanes, the horizontal stabilizers and landing flaps can also be operated by way of a control system without direct mechanical coupling. The position of the control handle operated by the pilot is sensed to generate a desired position signal having a value corresponding to a desired position of the horizontal stabilizers and landing flaps. The desired position signal value is read by a control system, which in turn sends out signals to motors which adjust the horizontal stabilizers and landing flaps to the desired position, as a function of a comparison between the desired position and the actual position. This concept, which is also called "fly by wire", has become so safe and developed that it is also used in passenger planes.

It is an object of the invention to provide an advantageous steering system for a non-track vehicle.

This and other objects have been achieved according to the present invention by providing a steering system for a non-track vehicle, and a method of controlling a steering transmission ratio of a non-track vehicle, having at least one steered wheel operated by a steering handle, the steering handle having a center position corresponding to a straight-ahead position of the steered wheel, the steering handle being movable between the center position and an adjusting position to move the steered wheel between the straight-ahead position and a steering angle, wherein a steering transmission ratio between an adjusting movement of the steering handle and an adjusting movement of the steered wheel is controlled according to a characteristic diagram at least as a function of the adjusting position of the steering handle or the steering angle of the steered wheel and of the vehicle speed.

According to the present invention, the steering transmission ratio between the adjusting movements of the steering handle and the steering angles of the steered wheels are varied at least as a function of the steering angle and the driving speed according to a characteristic diagram.

It is preferable that the steering handle and the steered wheels are operatively connected only by way of a controlled system which generates a desired steering angle value as a function of the position of the steering handle, and which uses at least one motor to adjust the steering angle of the steered wheels, the motor being controlled by the system to adjust the steering angle as a function of a comparison between the desired position and the actual position.

Since there is no direct mechanical coupling between the steering handle and the steered wheels, the steering transmission ratio between the steering handle and the vehicle wheels may be designed in a very flexible, parameter dependent manner, independently of the kinematics of the adjusting elements of the steered wheels. Furthermore, the present invention advantageously reduces the steering system space requirements in the vehicle, and allows increased flexibility in the design and layout of not only the steering system components themselves, but of other vehicle components, since a direct mechanical coupling between the steering handle and the steered wheels is no longer necessary.

According to one aspect of the present invention, the steering ratio between the steering handle and the steered wheels is advantageously controlled to be more direct, i.e., lower, in the case of larger steering angles as well as at low vehicle speeds.

In addition, the automatic change of the steering transmission ratio can easily be carried out such that, when the steering handle is held still, the respective adjusted steering angle of the steered wheels can also not change or change only in a delayed manner during changes of the parameters changing the steering transmission ratio.

In order to ensure that the straight-ahead position of the steered wheels always coincides with a center position of the steering handle, it is provided that, after a steering adjustment, the steered wheels will always reach the straight-ahead position exactly when the steering handle returns into the center position.

These and other objects, features and advantages of the present invention will become more readily apparent from the following detailed description when taken in conjunction with the accompanying drawings.

DETAILED DESCRIPTION OF THE DRAWINGS

Figure 1:
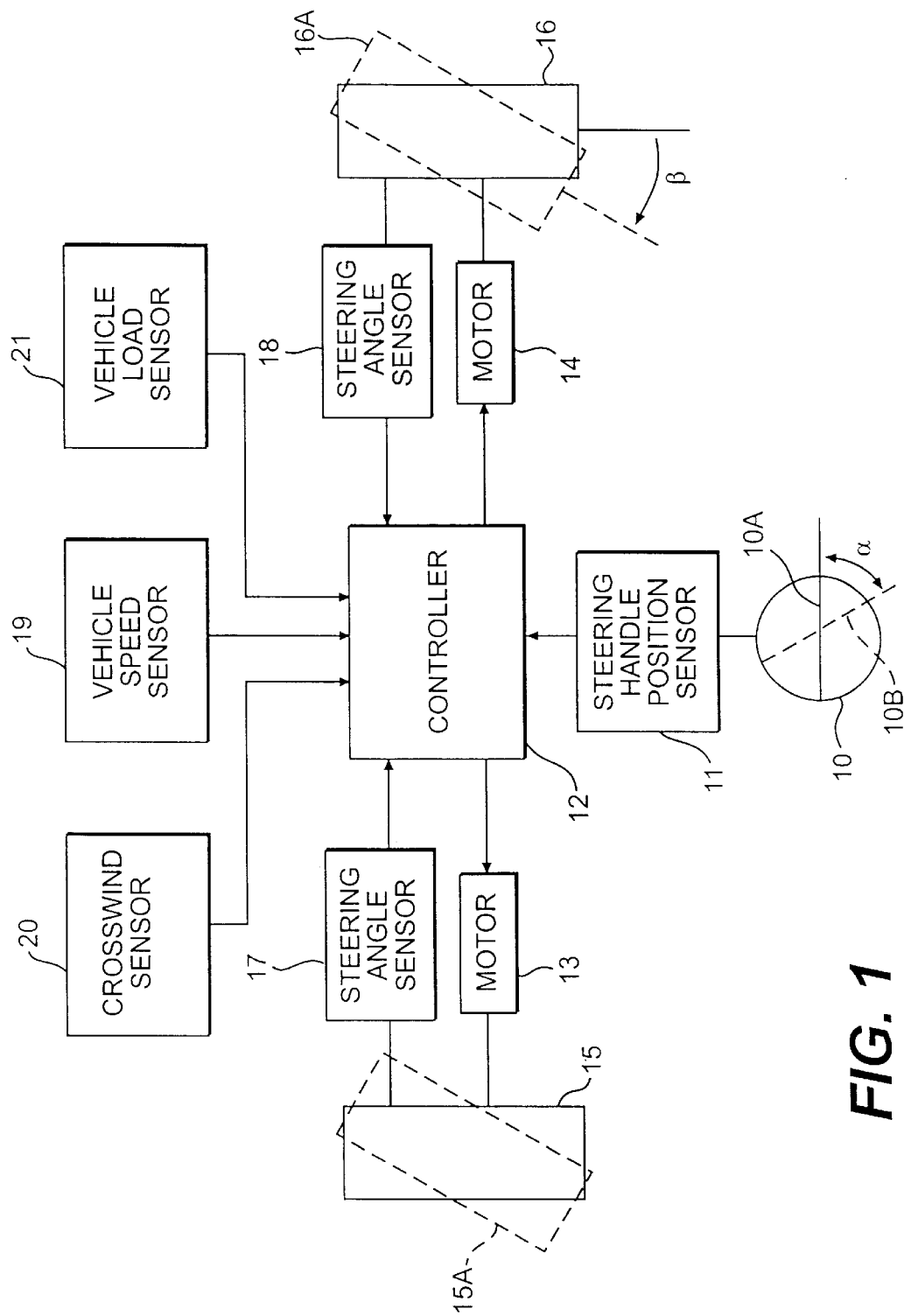
FIG. 1 is a schematic view of a steering system for a non-track vehicle according to a preferred embodiment of the present invention.

Referring to FIG. 1, a steering handle 10 shown as a steering wheel is connected to an steering handle position sensor 11. The steering handle position sensor outputs a signal based on the position of the steering handle 10 to a controller 12. Motors 13, 14 are connected to steered wheels 15, 16, respectively, for controlling the steering angle β of the steered wheels with respect to a straight-ahead position. Although the illustrated embodiment shows a separate motor 13, 14 for each steered wheel 15, 16, a single motor may be used to control the steering angle β of both steered wheels 15, 16. Furthermore, the present invention is not limited to vehicles having two steered wheels, and may be used with vehicles having any number of steered wheels.

The steering handle 10 has a center position 10A shown in solid lines, which corresponds to the straight-ahead position of the steered wheels 15, 16 shown in solid lines in FIG. 1 in a schematic top view. The steering handle 10 is also shown in a rotated position 10B in broken lines rotated to the adjusting position α, which corresponds to a rotated position 15A, 16A of the steered wheels shown in broken lines rotated to the steering angle β.

A steering angle sensor senses the steering angle β of the steered wheels 15, 16, and outputs a signal to the controller 12. A steering angle sensor 17, 18 is connected to each steered wheel 15, 16, respectively, to sense the steering angle β thereof and to output a signal to the controller 12. The controller 12 also receives signals from a vehicle speed sensor 19, a cross-wind sensor 20, and a vehicle load sensor 21. The controller 12 controls the motors 13, 14 as a function of at least the adjusting position α of the steering handle or the steering angle β of the steered wheels and of the vehicle speed v.

The controller 12 may control the steering angle β of the steered wheels in the following manner. The steering handle position sensor 11 senses the adjusting position α of the steering handle 10 and outputs a desired position signal corresponding to a desired position of the steered wheels 15, 16. The steering angle sensors 17, 18 sense the actual steering angle β of the steered wheels 15, 16 and ouputs an actual steering angle signal corresponding the actual steering angle of the steered wheels. The controller 12 reads the desired position signal from the steering handle position sensor 11 and the actual steering angle signal from the steering angle sensors 17, 18, and compares these two input signals. If there is a difference between the desired position signal and the actual steering angle signal, the controller outputs a signal to the motors 13, 14 to adjust the steering angle β of the steered wheels 15, 16 to reduce the difference.

The controller 12 may control the transmission ratio R between an adjusting movement of the steering handle 10 and a movement of the steered wheels 15, 16 in the following manner. The controller 12 reads input signals sensed by the steering handle position sensor 11, the steering angle sensors 17, 18, the vehicle speed sensor 19, the cross-wind sensor 20, and the vehicle load sensor 21. The controller determines a desired transmission ratio R from a characteristic diagram for the sensed signals, for example, the characteristic diagram shown in FIG. 2. The characteristic diagram may be based upon any of the input signals alone, or any combination of input signals. The characteristic diagram may, for example, be stored in a memory as a mathematical function which the controller evaluates a steering transmission ratio as a function of the sensed input signals, or the characteristic diagram may, for example, be a data table having transmission ratio output values for a plurality of data sets stored in a memory. In the latter case, the controller may be provided with an interpolation function to determine output values for sensed input signals falling between the data sets in the data table.

The controller 12 may itself be, or may be connected with, a general purpose processor programmed with instructions that cause the processor to perform the described steps, specific hardware components that contain hard-wired logic for performing the described steps, or any combination of programmed general purpose computer components and custom hardware components.

Figure 2:
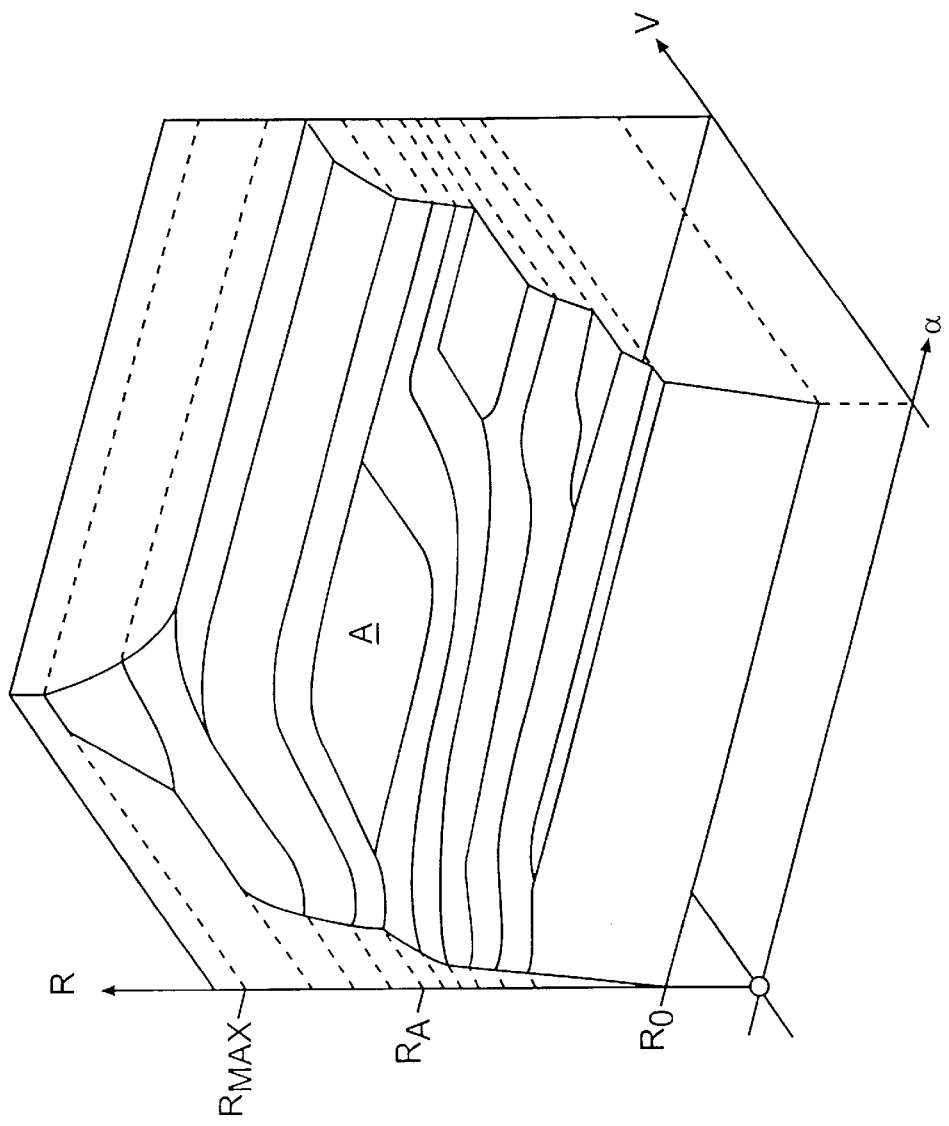
FIG. 2 shows an example of a characteristic diagram of the steering transmission ratio according to the present invention.

As illustrated in the characteristic diagram shown in FIG. 2, the steering transmission ratio R between the adjusting movement of the steering handle and the movement of the steering angle β of the steered wheels may be controlled as a function of the vehicle speed v and the adjusting position α of the steering handle 10. In the example shown, a constant steering transmission ratio $R_A$ exists within a relatively wide range A of the steering angle α of the steering handle and of the driving speed v.

At very high driving speeds, the steering transmission ratio is significantly increased. In other words, the steering becomes clearly more indirect, where at very small adjusting angles α of the steering handle 10, that is, close to the center position 10A, a particularly high steering transmission ratio $R_{max}$ is provided.

At a lower speed, the steering becomes more direct, i.e., the steering transmission ratio between the movement of the steering handle 10 and the movement of the steered wheels 15, 16 is lowered, as shown by steering transmission ratio $R_O$.

As a result, in the case of the shown conditions, a particularly high safety is achieved since, because of the indirect steering, at a high driving speed, the possibility of an extreme steering of the vehicle which could cause loss of control of the vehicle is highly reduced. On the other hand, a good handling is ensured at low speeds and thus during low-speed maneuvers such as parking.

In addition to the mentioned parameters, adjusting position α and driving speed v, the controller 12 can adjust the steering transmission ratio R as a function of additional parameters, such as the loading of the vehicle, sensed by the vehicle load sensor 21.

Furthermore, the system can be constructed such that, in special driving situations detected by separate sensors, for example, during swerving movements of the vehicle or in the case of cross-wind gusts, an automatic steering intervention takes place during which the steered vehicle wheels, without any action by the driver, carry out a steering maneuver which stabilizes the vehicle.

If, while the steering handle 10 is held still or is adjusted only very slowly during cornering, the driver accelerates strongly or brakes more intensively, the steering transmission ratio R between the adjusting movement of the steering handle 10 and the steering angle β of the steered vehicle wheels is at first left unchanged according to a preferred embodiment and is only then, after a delay time, slowly adapted to the value given by the characteristic diagram. As a result, automatic steering angle changes of the steered vehicle wheels which might surprise the driver during high rates of acceleration or deceleration during a cornering operation are avoided.

Optionally, the controller 12 may control the steering transmission ratio R only as a function of the adjusting position α of the steering handle 10 and/or the steering angle β of the steered wheels 15, 16, i.e., without considering to the vehicle speed v. Or, the controller 12 may control the steering transmission ratio R only as a function of the vehicle speed v, i.e., without considering the adjusting position α of the steering handle 10 and/or the steering angle β of the steered wheels 15, 16. Alternatively, the controller 12 may adjust the steering transmission ratio R only when the steering handle 10 is in the center position 10A.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A steering system for a vehicle having at least one steered wheel operated by a steering handle, said steering handle having a center position corresponding to a straight-ahead position of the steered wheel, said steering handle being movable between said center position and an adjusting position to move said steered wheel between said straight-ahead position and a steering angle, wherein a steering transmission ratio between an adjusting movement of the steering handle and an adjusting movement of the steered wheel is controlled according to a characteristic diagram at least as a function of the adjusting position of the steering handle or the steering angle of the steered wheel and of the vehicle speed, and wherein the steering transmission ratio is controlled to remain constant or to change only in a delayed manner when the driving speed changes rapidly during an acceleration or a deceleration of the vehicle, and when the steering handle is in said adjusting position and is held still or is adjusted very slowly.

2. A steering system according to claim 1, wherein the steering handle and the steered wheel are operatively connected by a controller.

3. A steering system according to claim 1, wherein the steering transmission ratio is controlled to increase as at least one of said vehicle speed increases and said adjusting position of the steering handle decreases with respect to said center position.

4. A steering system according to claim 1, wherein the steered wheel is controlled to be in said straight-ahead position when the steering handle is in said center position.

5. A steering system for a vehicle having at least one steered wheel operated by a steering handle, said steering handle having a center position corresponding to a straight-ahead position of the steered wheel, said steering handle being movable between said center position and an adjusting position to move between steered wheel between said straight-ahead position and a steering angle, wherein a steering transmission ratio between an adjusting movement of the steering handle and an adjusting movement of the steered wheel is controlled according to a characteristic diagram at least as a function of the adjusting position of the steering handle or the steering angle of the steered wheel and of the vehicle speed, and wherein the steering transmission ratio is controlled to be constant in a mean range of the vehicle speed as well as of the adjusting position of the steering handle or the steering angle of the steered wheel.

6. A steering system for a vehicle having at least one steered wheel operated by a steering handle, said steering handle having a center position corresponding to a straight-ahead position of the steered wheel, said steering handle being movable between said center position and an adjusting position to move said steered wheel between said straight-ahead position and a steering angle, wherein a steering transmission ratio between an adjusting movement of the steering handle and an adjusting movement of the steered wheel is controlled according to a characteristic diagram at least as a function of the adjusting position of the steering handle or the steering angle of the steered wheel and of the vehicle speed, and wherein the steering transmission ratio is further controlled as a function of a vehicle load.

7. A steering system according to claim 6, wherein the steering transmission ratio is controlled to remain constant or to change only in a delayed manner when the driving speed changes rapidly during an acceleration or a deceleration of the vehicle, and when the steering handle is in said adjusting position and is held still.

8. A steering system for a vehicle comprising:

a steering handle which is movable between a center position and an adjusting position;

a steering handle position sensor coupled to said steering handle;

a controller coupled to said steering handle position sensor;

at least one steered wheel;

an adjusting device coupled to said at least one steered wheel and coupled to said controller, said controller controlling said adjusting device to move said steered wheel between a straight-ahead position and a steering angle; and a vehicle speed sensor coupled to said controller, wherein said controller controls a steering transmission ratio between an adjusting movement of the steering handle and an adjusting movement of the steered wheel according to a characteristic diagram as a function of the adjusting position of the steering handle and the vehicle speed, and wherein the steering transmission ratio is controlled to remain constant or to change only in a delayed manner when the driving speed changes rapidly during an acceleration or a deceleration of the vehicle, and when the steering handle is in said adjusting position and is held still or is adjusted very slowly.

9. A steering system according to claim 8, further comprising a steering angle sensor coupled to said steered wheel and to said controller, said steering angle sensor sensing said steering angle of said steered wheel, wherein said controller further controls said steering transmission ratio as a function of said steering angle.

10. A steering system according to claim 8, wherein the steered wheel is controlled to be in said straight-ahead position when the steering handle is in said center position.

11. A steering system for a vehicle comprising:

a steering handle which is movable between a center position and an adjusting position;

a steering handle position sensor coupled to said steering handle;

a controller coupled to said steering handle position sensor;

at least one steered wheel;

an adjusting device coupled to said at least one steered wheel and coupled to said controller, said controller controlling said adjusting device to move said steered wheel between a straight-ahead position and a steering angle; and a vehicle speed sensor coupled to said controller, wherein said controller controls a steering transmission ratio between an adjusting movement of the steering handle and an adjusting movement of the steered wheel according to a characteristic diagram as a function of the adjusting position of the steering handle and the vehicle speed, and wherein the steering transmission ratio is controlled to increase as at least one of said vehicle speed increases and said adjusting position of the steering handle decreases with respect to said center position.

12. A steering system for a vehicle comprising:

a steering handle which is movable between a center position and an adjusting position;

a steering handle position sensor coupled to said steering handle;

a controller coupled to said steering handle position sensor;

at least one steered wheel;

an adjusting device coupled to said at least one steered wheel and coupled to said controller, said controller controlling said adjusting device to move said steered wheel between a straight-ahead position and a steering angle; and a vehicle speed sensor coupled to said controller, wherein said controller controls a steering transmission ratio between an adjusting movement of the steering handle and an adjusting movement of the steered wheel according to a characteristic diagram as a function of the adjusting position of the steering handle and the vehicle speed, and wherein the steering transmission ratio is controlled to be constant in a mean range of the vehicle speed as well as of the adjusting position of the steering handle or the steering angle of the steered wheel.

13. A steering system for a vehicle comprising:

a steering handle which is movable between a center position and an adjusting position;

a steering handle position sensor coupled to said steering handle;

a controller coupled to said steering handle position sensor;

at least one steered wheel;

an adjusting device coupled to said at least one steered wheel and coupled to said controller, said controller controlling said adjusting device to move said steered wheel between a straight-ahead position and a steering angle;

a vehicle speed sensor coupled to said controller, a vehicle load sensor coupled to said controller to sense a vehicle load, wherein said controller controls a steering transmission ratio between an adjusting movement of the steering handle and an adjusting movement of the steered wheel according to a characteristic diagram as a function of the adjusting position of the steering handle, the vehicle speed, and the vehicle load.

14. A steering system according to claim 13, wherein the steering transmission ratio is controlled to remain constant or to change only in a delayed manner when the driving speed changes rapidly during an acceleration or a deceleration of the vehicle, and when the steering handle is in said adjusting position and is held still.

15. A method of controlling a steering transmission ratio of a vehicle having at least one steered wheel operated by a steering handle, said steering handle having a center position corresponding to a straight-ahead position of the steered wheel, said steering handle being movable between said center position and an adjusting position to move said steered wheel between said straight-ahead position and a steering angle, said method comprising the steps of:

controlling a steering transmission ratio between an adjusting movement of the steering handle and an adjusting movement of the steered wheel according to a characteristic diagram at least as a function of the adjusting position of the steering handle or the steering angle of the steered wheel and of the vehicle speed, and controlling the steering transmission ratio to remain constant or to change only in a delayed manner when the driving speed changes rapidly during an acceleration or a deceleration of the vehicle, and when the steering handle is in said adjusting position and is held still or is adjusted very slowly.

16. A method according to claim 15, wherein the steering transmission ratio is controlled to increase as at least one of said vehicle speed increases and said adjusting position of the steering handle decreases with respect to said center position.

17. A method according to claim 15, further comprising the step of controlling the steered wheel to be in said straight-ahead position when the steering handle is in said center position.

18. A method of controlling a steering transmission ratio of a vehicle having at least one steered wheel operated by a steering handle, said steering handle having a center position corresponding to a straight-ahead position of the steered wheel, said steering handle being movable between said center position and an adjusting position to move said steered wheel between said straight-ahead position and a steering angle, said method comprising the step of controlling a steering transmission ratio between an adjusting movement of the steering handle and an adjusting movement of the steered wheel according to a characteristic diagram at least as a function of the adjusting position of the steering handle or the steering angle of the steered wheel and of the vehicle speed, wherein the steering transmission ratio is controlled to be constant in a mean range of the vehicle speed as well as of the adjusting position of the steering handle or the steering angle of the steered wheel.

19. A method of controlling a steering transmission ratio of a vehicle having at least one steered wheel operated by a steering handle, said steering handle having a center position corresponding to a straight-ahead position of the steered wheel, said steering handle being movable between said center position and an adjusting position to move said steered wheel between said straight-ahead position and a steering angle, said method comprising the steps of:

controlling a steering transmission ratio between an adjusting movement of the steering handle and an adjusting movement of the steered wheel according to a characteristic diagram at least as a function of the adjusting position of the steering handle or the steering angle of the steered wheel and of the vehicle speed, and controlling the steering transmission ratio as a function of a vehicle load.

20. A method according to claim 19, further comprising the step of controlling the steering transmission ratio to remain constant or to change only in a delayed manner when the driving speed changes rapidly during an acceleration or a deceleration of the vehicle, and when the steering handle is in said adjusting position and is held still.

* * * * *